United States Patent
Bryant et al.

(10) Patent No.: US 9,875,187 B2
(45) Date of Patent: Jan. 23, 2018

(54) INTERRUPTION OF A PAGE MISS HANDLER

(71) Applicant: INTEL CORPORATION, Santa Clara, CA (US)

(72) Inventors: Christopher D. Bryant, Austin, TX (US); Stephen J. Robinson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 14/566,390

(22) Filed: Dec. 10, 2014

(65) Prior Publication Data

US 2016/0170888 A1 Jun. 16, 2016

(51) Int. Cl.
  G06F 12/00 (2006.01)
  G06F 12/0855 (2016.01)
  G06F 12/0802 (2016.01)
  G06F 9/48 (2006.01)

(52) U.S. Cl.
  CPC ........... *G06F 12/0857* (2013.01); *G06F 9/48* (2013.01); *G06F 12/0802* (2013.01); *G06F 2212/1021* (2013.01); *G06F 2212/1024* (2013.01); *G06F 2212/281* (2013.01); *G06F 2212/608* (2013.01); *G06F 2212/65* (2013.01)

(58) Field of Classification Search
  CPC .............. G06F 12/0857; G06F 12/10; G06F 2212/1021; G06F 2212/65; G06F 2212/281; G06F 2212/608; G06F 2212/1024
  USPC .......................................... 711/205, 206, 207
  See application file for complete search history.

(56) References Cited

U.S. PATENT DOCUMENTS

| | | | | |
|---|---|---|---|---|
| 5,564,111 A | * | 10/1996 | Glew | G06F 9/3842 711/202 |
| 8,533,425 B1 | * | 9/2013 | Yuan | G06F 13/1642 711/133 |
| 2002/0062425 A1 | * | 5/2002 | Chauvel | G06F 1/206 711/130 |
| 2002/0069327 A1 | * | 6/2002 | Chauvel | G06F 1/206 711/130 |
| 2002/0069328 A1 | * | 6/2002 | Chauvel | G06F 1/3203 711/130 |
| 2004/0117591 A1 | * | 6/2004 | Arimilli | G06F 12/08 711/203 |
| 2007/0005933 A1 | * | 1/2007 | Kopec | G06F 9/3802 711/207 |
| 2010/0011188 A1 | * | 1/2010 | Eddy | G06F 9/383 711/207 |
| 2011/0107057 A1 | * | 5/2011 | Petolino, Jr. | G06F 12/1027 711/207 |
| 2013/0031332 A1 | * | 1/2013 | Bryant | G06F 12/084 711/207 |
| 2013/0103923 A1 | * | 4/2013 | Pan | G06F 12/1027 711/207 |

* cited by examiner

*Primary Examiner* — Yaima Rigol
*Assistant Examiner* — Tasnima Matin
(74) *Attorney, Agent, or Firm* — Lowenstein Sandler LLP

(57) ABSTRACT

A first operation associated with a request for a page miss handler may be identified. A second operation associated with a current execution of the page miss handler may also be identified. An age of the first operation and an age of the second operation may be determined. The page miss handler may be interrupted based on the age of the first operation and the age of the second operation by stopping the current execution of the page miss handler for the second operation and starting execution of the page miss handler for the first operation.

21 Claims, 12 Drawing Sheets

INTERRUPTION OF A PAGE MISS HANDLER

TECHNICAL FIELD

Embodiments described herein generally relate to a page miss handler and, more specifically, relate to interruption of a page miss handler.

BACKGROUND

A processing device may be based on an out of order (OOO) architecture. An OOO-based processing device may execute instructions in an order based on the availability of input data rather than by the original order of the instructions as provided by a program. By using such an OOO scheme, the processing device may make use of instruction cycles that would otherwise be idle while data is retrieved for the next instruction in a program.

DESCRIPTION OF EMBODIMENTS

Figure 1:
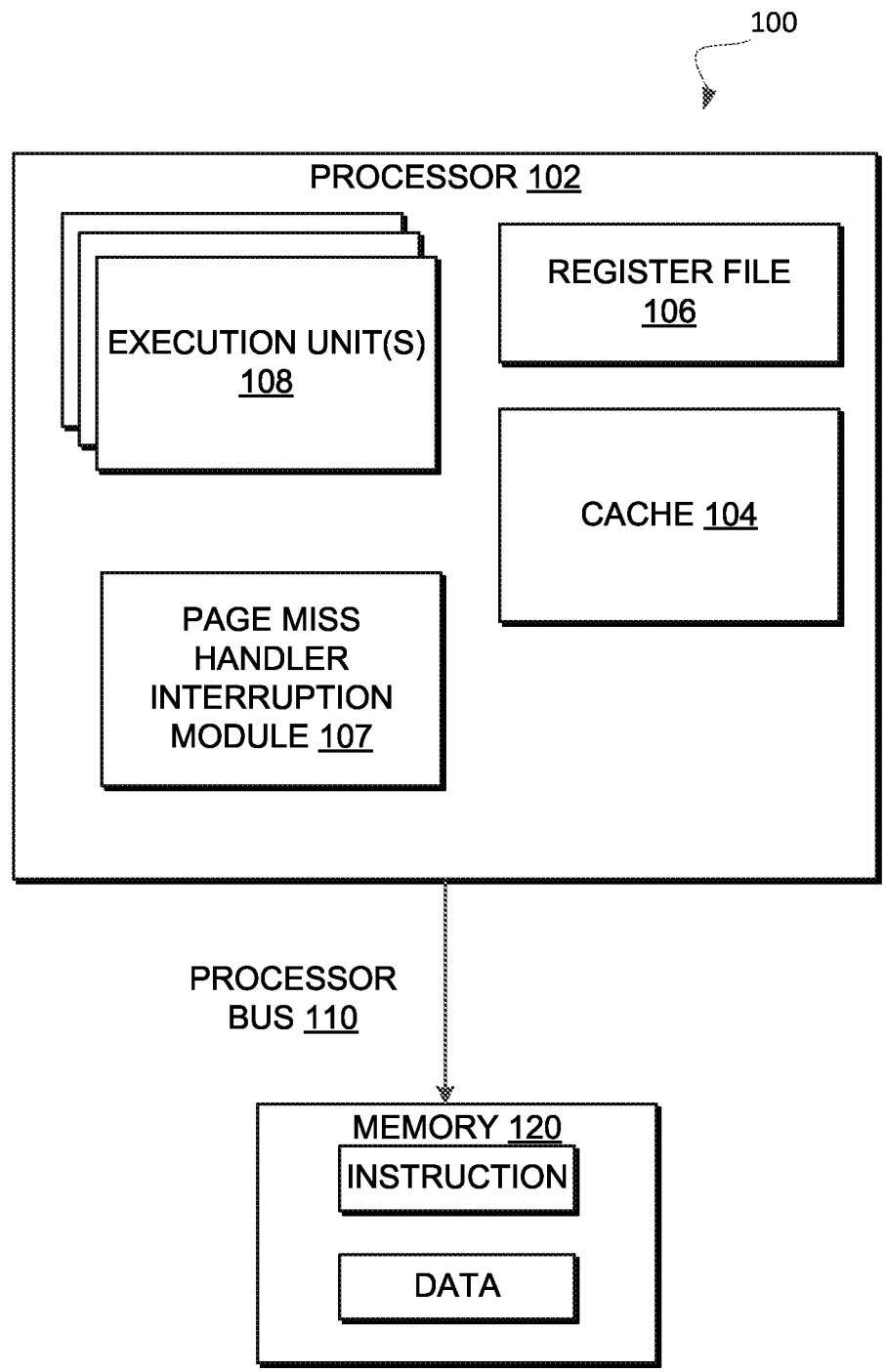
FIG. 1 is a block diagram illustrating a computing system that implements a page miss handler interruption module to interrupt a page miss handler in accordance with some embodiments.

Aspects of the present disclosure are directed to interrupting a page miss handler in a processing architecture. The interruption of a page miss handler may be used to improve the performance of a processor, processing device, or a processor-based system. For example, the performance of a processing device may be improved by determining when to interrupt a page miss handler. A processing device may include a processor core, a page miss handler, and a memory. The processor core may issue a first instruction at a first time and a second instruction at a second time (e.g., the first instruction is older or issued earlier than the second instruction). Each of the first and second instructions may be associated with a virtual address (e.g., an address in an address space made available by a program) that may require the translating of the virtual address to a physical address (e.g., an address associated with the memory of the processing device). A cache memory (e.g., a translation lookaside buffer) may be used to store information to translate a virtual address to a physical address. However, if the cache memory does not currently store the necessary information to translate a specific virtual address of an instruction to a physical address (i.e., a situation referred to as a page miss), then the virtual address may be translated to a physical address by computing contents of multiple memory locations to the translated physical address. Such computations to translate the virtual address to the physical address may be performed by a page miss handler. The computations performed by the page miss handler in response to a page miss may require additional processing time resulting in decreased performance of the processing device.

Modern microprocessor-based products, including a System on a Chip (SoC), clients, servers, and hardware accelerators, may utilize a page miss handler to perform the computations required in response to a page miss associated with an instruction in an out of order (OOO) architecture. For example, a first instruction may be issued at a first time and a second instruction may be issued at a second time. In the OOO architecture, the second instruction may be executed before the first instruction is executed despite being issued at a later time (e.g., the second instruction is younger than the first instruction). Furthermore, if the second instruction is associated with a page miss, then the page miss handler may be executed to compute the address translation for the second instruction. While the page miss handler is currently executing to compute the address translation for the second instruction, the first instruction may also be associated with a page miss and thus also require the execution of the page miss handler to compute the address translation for the first instruction. Accordingly, while the address translation of the younger instruction is currently performed or executed by the page miss handler, the older instruction may require an address translation of the page miss handler. In some embodiments, a page miss handler interruption module may be used to determine when to interrupt (i.e., stop) the page miss handler from executing the address translation for the second instruction and to execute or instruct the page miss handler to execute computations to determine the address translation for the first instruction.

The page miss handler interruption module may determine to interrupt the page miss handler based on the age and virtual address of an instruction currently associated with the execution of the page miss handler and the age and virtual address of another instruction requiring the execution of the page miss handler. For example, if the second instruction is currently associated with the execution of the page miss handler (e.g., the virtual address of the second instruction is currently being translated to a corresponding physical address) and the first instruction is associated with a page miss while the page miss handler is performing the address translation of the second instruction, then the page miss handler may be interrupted when the virtual address of the first instruction and the virtual address of the second instruction are not the same and when the first instruction is older or issued earlier than the second instruction. However, if the virtual addresses associated with the first instruction and the second instruction are the same, then the page miss handler may not be interrupted as the virtual address currently translated by the page miss handler is the same as the virtual address of the first operation that is needed to be translated by the page miss handler. Furthermore, the page miss handler interruption module may interrupt the page miss handler when the first instruction is older than the second instruction. However, if the first instruction is not older than the second instruction, then the page miss handler interruption module may not interrupt the page miss handler. In some embodiments, the page miss handler interruption module may further interrupt the page miss handler based on an execution state of the page miss handler.

Such interruption of the page miss handler may improve the overall performance of a processing device. For example, the page miss handler may perform the address translation associated with a younger instruction in an OOO architecture while the page miss handler may be interrupted when an older instruction requires the page miss handler for another address translation. Therefore, the performance of the processing device using a page miss handler interruption module may be improved by executing the page miss handler to perform the address translation of a younger instruction when an older instruction does not require the address translation of the page miss handler, but may interrupt the page miss handler from executing to perform the address translation of the younger instruction when the older instruction requires the use of the page miss handler for another address translation.

FIG. 1 is a block diagram illustrating a computing system 100 that implements a page miss handler interruption module 107 for determining when to interrupt the execution of an address translation by a page miss handler in accordance with some embodiments. The computing system 100 is formed with a processor 102 that includes one or more execution units 108 to execute an operation or instruction (e.g., store or load instruction) in accordance with one or more embodiments as described herein. In some embodiments, one or more of the execution units 108 may perform the functionality of a page miss handler. In short, the page miss handler interruption module 107 is used by the processor 102 to identify an instruction requiring a use of the page miss handler to translate an address (e.g., translating a virtual address to a physical address of the memory 120 or cache 104) and another instruction that is associated with the current execution to translate an address by the page miss handler. The page miss handler interruption module 107 may determine whether to interrupt the current execution of the page miss handler based on the instruction that requires the execution of the page miss handler to translate another address and the instruction with an address currently being translated by the page miss handler. Additional details with regard to the page miss handler interruption module 107 are described in more detail below with respect to FIGS. 2-6.

Computing system 100 includes a component, such as a processor 102, to employ execution units 108 including logic to perform algorithms for processing data in accordance with the embodiments described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes, and the like) may also be used. In one embodiment, sample computing system 100 executes a version of the WINDOWS™ operating system available from Microsoft Corporation of Redmond, Wash., although other operating systems (e.g., UNIX and Linux), embedded software, and/or graphical user interfaces may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Examples of handheld devices include, but are not limited to, cellular phones, Internet Protocol devices, digital cameras, personal digital assistants (PDAs), and handheld PCs. Embedded applications may include, but are not limited to, a micro controller, a digital signal processor (DSP), system on a chip (SoC), network computers (NetPC), set-top boxes, network hubs, wide area network (WAN) switches, or any other system that can perform one or more instructions in accordance with at least one embodiment.

In the illustrated embodiment of FIG. 1, processor 102 includes one or more execution units 108 to implement an algorithm that is to perform at least one instruction or operation. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, an out of order based processor, or any other processor device, such as a digital signal processor, for example. The processor 102 is coupled to a processor bus 110 that transmits data signals between the processor 102 and other components in the system 100, such as main memory 120 storing instruction, data, or any combination thereof. The other components of the system 100 may include, but are not limited to, a graphics accelerator, a memory controller hub, an I/O controller hub, a wireless transceiver, a Flash BIOS, a network controller, an audio controller, a serial expansion port, and an I/O controller. These elements perform their conventional functions that are well known to those familiar with the art.

In one embodiment, the processor 102 includes a Level 1 (L1) internal cache memory 104. Depending on the architecture, the processor 102 may have a single internal cache memory or multiple levels of internal cache memories (e.g., L1 and L2). Other embodiments include a combination of both internal and external caches depending on the particular implementation and needs. Register file 106 is to store different types of data in various registers including, but not limited to, integer registers, floating point registers, vector registers, banked registers, shadow registers, checkpoint registers, status registers, configuration registers, and instruction pointer registers.

Execution unit 108, including logic to perform integer and floating point operations, also resides in the processor 102. It should be noted that the execution unit may or may not have a floating point unit. The processor 102, in one embodiment, includes a microcode (μcode) ROM to store microcode, which when executed, is to perform algorithms for certain macroinstructions or handle complex scenarios. Here, microcode is potentially undatable to handle logic bugs/fixes for processor 102. Alternative embodiments of an execution unit 108 may also be used in micro controllers, embedded processors, graphics devices, DSPs, and other types of logic circuits.

System 100 includes a main memory 120. Main memory 120 may include, but is not limited to, a dynamic random access memory (DRAM) device, a static random access memory (SRAM) device, flash memory device, or other memory device. Main memory 120 stores instructions and/or data represented by data signals that are to be executed by the processor 102. The processor 102 is coupled to the main memory 120 via a processor bus 110. A system logic chip, such as a memory controller hub (MCH) may be coupled to the processor bus 110 and main memory 120. An MCH can provide a high bandwidth memory path to memory 120 for instruction and data storage and for storage of graphics commands, data and textures. The MCH can be used to direct data signals between the processor 102, main memory 120, and other components in the system 100 and to bridge the data signals between processor bus 110, main memory 120, cache memory 104, and system I/O, for example. The MCH may be coupled to main memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the main memory 120, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the page miss handler interruption module 107 may be used with a system on a chip. The memory for one such system may be a flash memory. The flash memory may be located on the same die as the processor and other system components. Additionally, other logic blocks, such as a memory controller or graphics controller, may also be located on a system on a chip.

Figure 2:
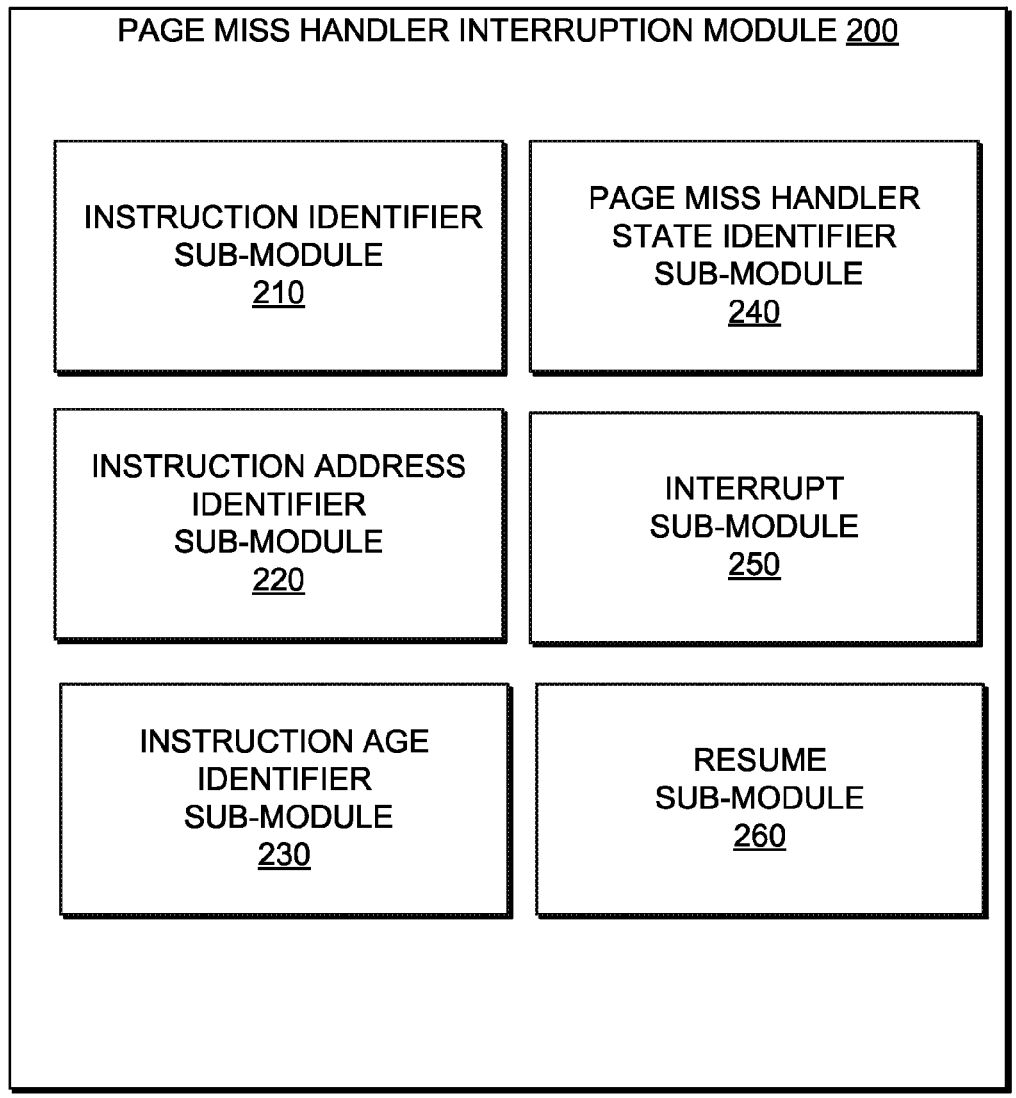
FIG. 2 is a block diagram illustrating a page miss handler interruption module in accordance with some embodiments of the disclosure.

FIG. 2 is a block diagram illustrating an example page miss handler interruption module 200 in accordance with some embodiments of the disclosure. The page miss handler interruption module 200 may correspond to the page miss handler interruption module 107 of FIG. 1. In general, the page miss handler interruption module 200 may include an instruction identifier sub-module (or function block) 210, an instruction address identifier sub-module (or function block) 220, an instruction age identifier sub-module (or function block) 230, a page miss handler state identifier sub-module (or function block) 240, an interrupt sub-module (or function block) 250, and a resume sub-module (or function block) 260. In alternative embodiments, the functionality of one or more of the sub-modules may be combined or divided. For example, a single sub-module may perform the functionality of the instruction identifier sub-module 210, instruction address identifier sub-module 220, instruction age identifier sub-module 230, page miss handler state identifier sub-module 240, interrupt sub-module 250, and the resume sub-module 260. Alternatively, the functionality of each of the sub-modules 210, 220, 230, 240, 250, and 260 may be separated between multiple sub-modules.

As shown in FIG. 2, the page miss handler interruption module 200 may include an instruction identifier sub-module 210. In some embodiments, the instruction identifier sub-module 210 may identify a first instruction associated with a page miss. For example, the first instruction may be identified where the instruction is associated with a virtual address that is to be translated to a physical address and information used to translate the virtual address to the physical address is not currently stored in a cache (e.g., the translation lookaside buffer). Accordingly, an instruction associated with a page walk and a need for a page miss handler to be executed to compute the virtual address to physical address translation for the instruction may be identified. Furthermore, in some embodiments, the instruction identifier sub-module 210 may identify a second instruction that is associated with a current execution of the page miss handler performing an address translation. For example, a first instruction may be identified where the first instruction is associated with a need for the page miss handler to perform an address translation and a second instruction may be identified where the second instruction is associated with a virtual address that is currently being translated to a physical address by the page miss handler. The instruction address identifier sub-module 220 may identify an address associated with the first instruction (e.g., the instruction requiring the use of the page miss handler) and an address associated with the second instruction (e.g., the instruction currently using the page miss handler). For example, a virtual address included in the first instruction and a virtual address included in the second instruction may be identified. The instruction age identifier sub-module 230 may identify an age associated with the first instruction and an age associated with the second instruction. In some embodiments, the age of an instruction may correspond to when the instruction was issued by a program. Accordingly, an instruction that is issued earlier than another instruction may be considered to be older and an instruction that is issued later than another instruction may be considered to be younger. Furthermore, the page miss handler state identifier sub-module 240 may identify a state of the page miss handler. In some embodiments, the state of the page miss handler may correspond to a current execution state of the page miss handler for translating a virtual address to a physical address in response to a page miss for an instruction. The execution of the page miss handler for translating a virtual address to a physical address in response to a page miss may include multiple execution states where a first group of the execution states may be considered to be executed before a point where interrupting the page miss handler may be efficient and a second group of the execution states that may be considered to be executed after the point where interrupting the page miss handler may be efficient. Further details with regard to the execution states of the page miss handler are disclosed in further detail in conjunction with FIG. 6.

Referring to FIG. 2, the page miss handler interruption module 200 may include an interrupt sub-module 250. In some embodiments, the interrupt sub-module 250 may interrupt a current execution of the page miss handler based on the age of a first instruction (e.g., an instruction requiring the page miss handler to perform an address translation) and an age of a second instruction (e.g., an instruction currently using the page miss handler for an address translation), an address of the first instruction and an address of the second instruction, and a current execution state of the page miss handler. For example, the page miss handler may be interrupted if the age of the first instruction is older than the age of the second instruction, the virtual address of the first instruction is different than the virtual address of the second instruction, and if the current execution state of the page miss handler is at a point where the interruption of the page miss handler is not inefficient (e.g., the first group as previously described). However, in some embodiments, if the virtual address of the first instruction is identical to the virtual address of the second instruction, then the interrupt module 250 may not interrupt the page miss handler. Furthermore, if the first instruction requesting the use of the page miss handler for an address translation is younger than the second instruction currently using the page miss handler for an address translation, then the interrupt module 250 may not interrupt the page miss handler (e.g., the page miss handler may continue to execute for the address translation of the second instruction). Additionally, if the current execution state of the page miss handler is beyond a point (e.g., a particular state) where interrupting the page miss handler is efficient (e.g., it is faster to finish the translation process than interrupting the page miss handler), then the interrupt module 250 may not interrupt the page miss handler. The resume sub-module 260 may resume the execution of the page miss handler to perform the address translation of the younger instruction. For example, the page miss handler may begin the address translation for the younger instruction associated with the execution of the page miss handler when the page miss handler was interrupted by the interrupt sub-module 250. Further details with regard to interrupting the page miss handler are described in conjunction with FIGS. 3-6.

Figure 3:
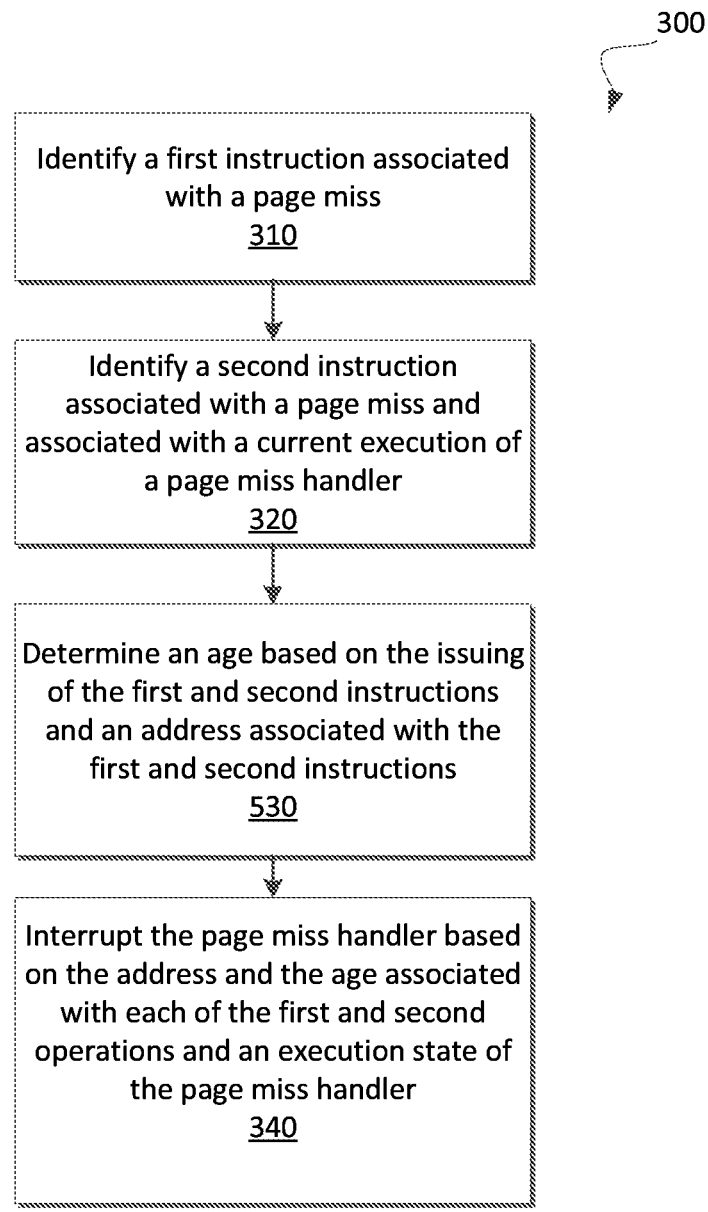
FIG. 3 is a flow diagram of a method to interrupt a page miss handler in accordance with some embodiments.

FIG. 3 is a flow diagram of a method 300 to interrupt a page miss handler in accordance with some embodiments. In some embodiments, the method 300 may be performed by the page miss handler interruption module 107 or 200. For example, the method 300 may be used by the page miss handler interruption module 107 of FIG. 1 or the page miss handler interruption module 200 of FIG. 2 to determine when to interrupt a page miss handler that is currently performing an address translation for an instruction associated with a page miss. The method 300 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 300.

As shown in FIG. 3, the method 300 may begin with the processing logic identifying, at block 310, a first instruction. In some embodiments, the first instruction may be an instruction that is associated with a page miss and that requires a page miss handler to translate an address associated with the first instruction. The processing logic may further identify a second instruction associated with a page miss and a current execution of the page miss handler (block 320). For example, the page miss handler may be currently translating the virtual address of the second instruction. The processing logic may determine ages associated with the first and second instructions and addresses associated with the first and second instructions (block 330). For example, the processing logic may determine whether the first instruction is older or younger than the second instruction and if the address associated with the first instruction (e.g., the address to be translated) is the same or different as the address associated with the second instruction (e.g., the address currently being translated by the page miss handler). Furthermore, the processing logic may interrupt the page miss handler based on the addresses associated with the first and second instructions, the ages of the first and second instructions, and an execution state of the page miss handler (block 340). For example, the processing logic may interrupt the page miss handler when the addresses associated with the first and second instructions are different, the first instruction is older than the second instruction, and when the execution state of the page miss handler is before a particular execution state where interrupting the page miss handler is more inefficient than allowing the translation process of the page miss handler to complete. However, if the addresses associated with the first and second instructions are identical, or if the first instruction is younger than the second instruction, or if the execution state of the page miss handler is after the particular execution state, then the page miss handler may not be interrupted.

In some embodiments, the interrupting of a page miss handler may refer to the stopping of the execution of the page miss handler from translating an address associated with an instruction (e.g., the second instruction) and beginning the translating of an address associated with another instruction (e.g., the first instruction). Accordingly, the interrupting of the page miss handler may result in the page miss handler switching from the translating of a first address associated with a first instruction that is associated with a page miss to a second address associated with a second instruction that is also associated with a page miss before the translating of the first address is completed.

Figure 4:
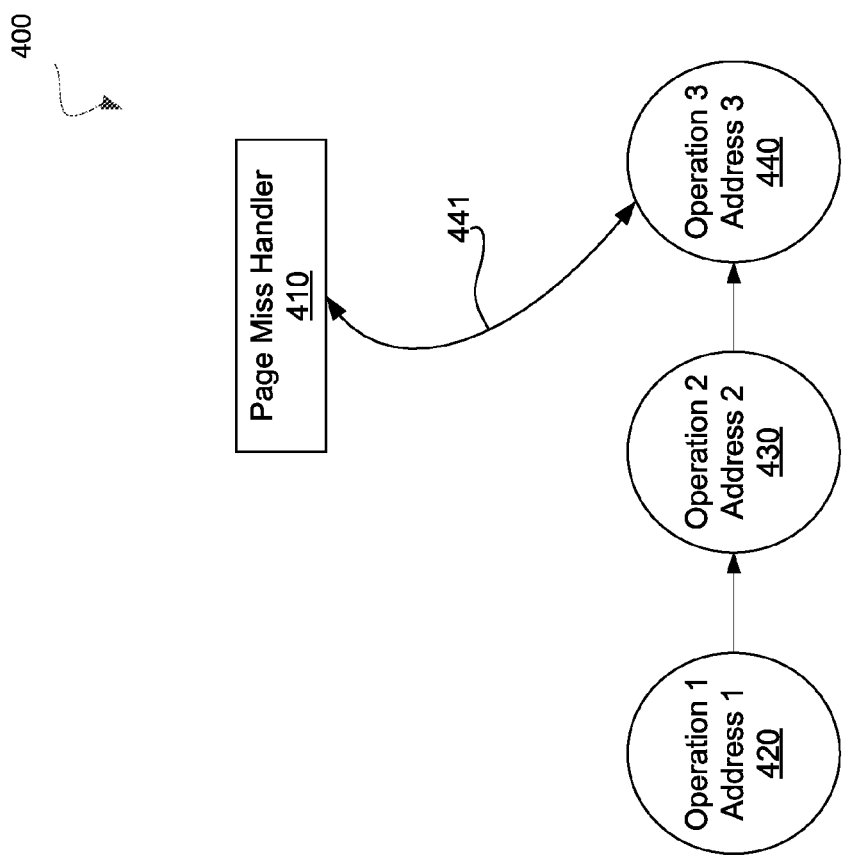
FIG. 4 illustrates an example instruction pipeline using a page miss handler in accordance with some embodiments in accordance with some embodiments.

FIG. 4 illustrates an example instruction pipeline 400 using a page miss handler in accordance with some embodiments. In general, the instructions of the instruction pipeline 400 may correspond to instructions as described in relation to the page miss handler interruption module 107 or 200 of FIGS. 1 and 2.

As shown in FIG. 4, the instruction pipeline 400 may be an out of order based instruction pipeline. For example, the instruction pipeline 400 may include an instruction 420, an instruction 430, and an instruction 440. In some embodiments, the instructions 420, 430, and 440 may be issued at different times. For example, the instruction 420 may be issued at a first time, the instruction 440 may be issued at a second time after the first time, and the instruction 430 may be issued at a third time after the first and second times. Accordingly, the instruction pipeline 400 may contain an order for the instructions that is not in a sequential order of issue time by a program. In some embodiments, the page miss handler 410 may translate an address associated with an instruction in response to a page miss. For example, the page miss handler 410 may translate the address for the instruction 440 when the address of the instruction 440 is associated with a page miss.

Figure 5:
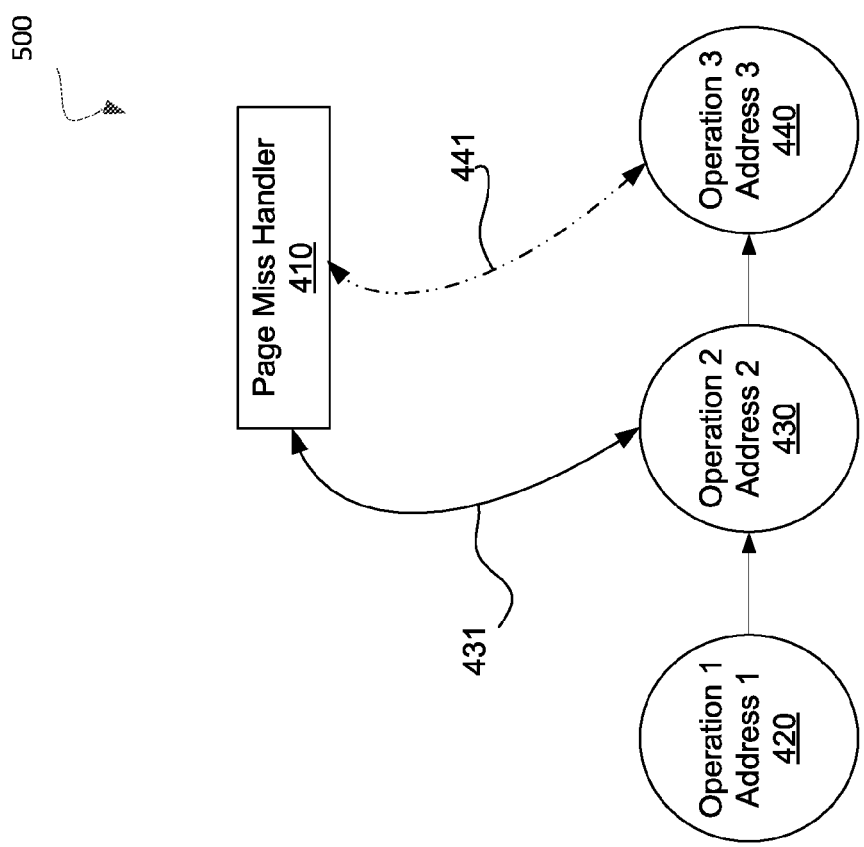
FIG. 5 illustrates an example instruction pipeline using a page miss handler after an interruption of the page miss handler in accordance with some embodiments of the disclosure.

FIG. 5 illustrates an example instruction pipeline 500 using a page miss handler in after an interruption of the page miss handler in accordance with some embodiments of the disclosure. In general, the instruction pipeline 500 may correspond to the instruction pipeline 400 after the interruption of the page miss handler. Furthermore, the instructions of the instruction pipeline 500 may correspond to instructions as described in relation to the page miss handler interruption module 107 or 200 of FIGS. 1 and 2.

As shown in FIG. 5, the instruction pipeline 500 may include the instructions 420, 430, and 440. As previously described, the page miss handler may translate the address associated with the instruction 440. For example, the page miss handle may currently be executing to translate 'Address 2' associated with the instruction 440. However, the instruction 420 may subsequently be associated with a page miss while the page miss handler is currently executing to translate 'Address 2.' Accordingly, in some embodiments, the page miss handler may be interrupted to translate 'Address 1' associated with the instruction 420. As such, the interruption of the page miss handler may stop the translating of an address and the beginning of the translating of another address. For example, since the instruction 420 is associated with an older age than the instruction 440 and is not associated with the same address requiring translation, the page miss handler may be interrupted from translating 'Address 2' associated with the instruction 440 and may begin translating 'Address 1' associated with the instruction 420.

Figure 6:
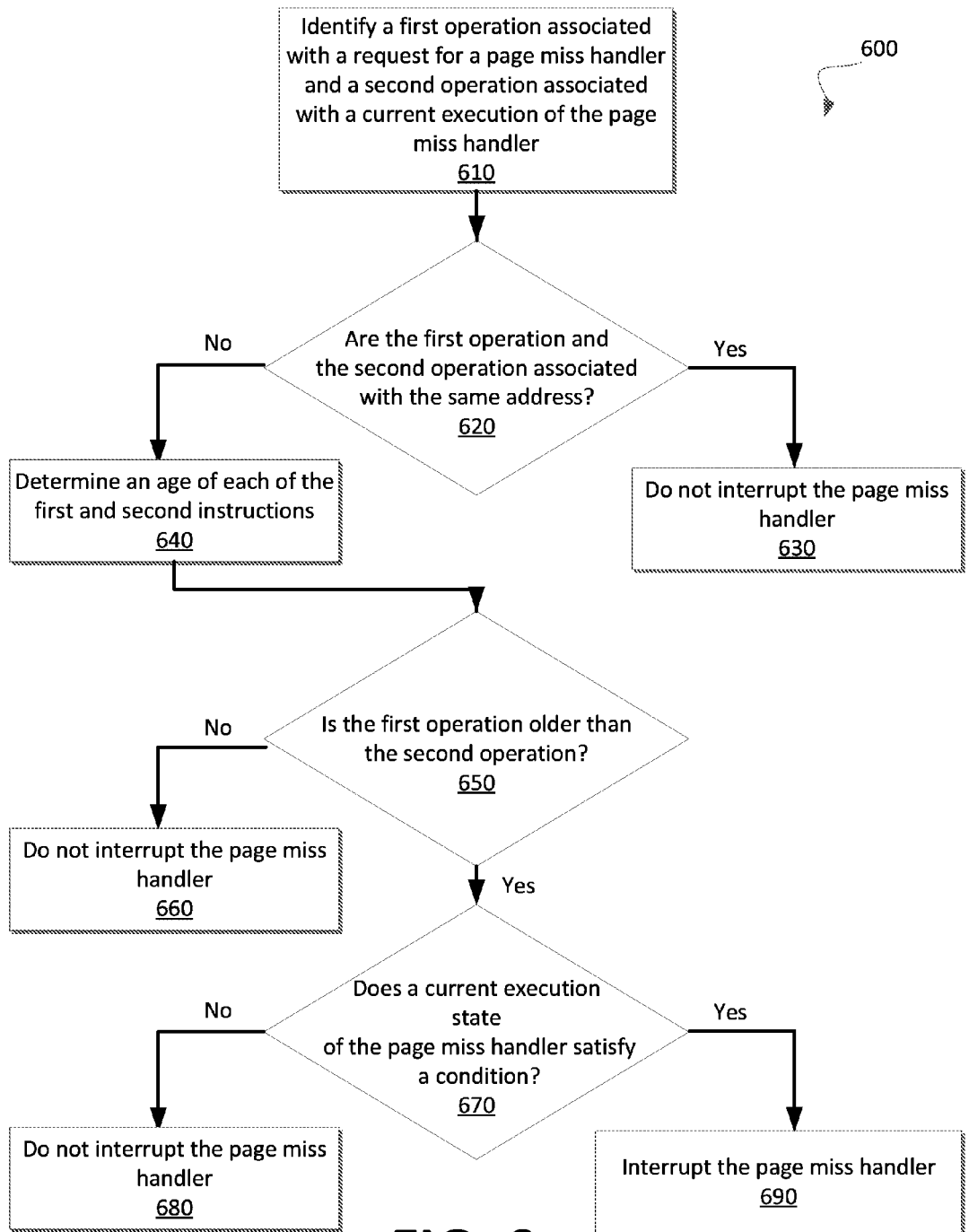
FIG. 6 is a flow diagram of an example method to interrupt a page miss handler in accordance with some embodiments of the disclosure.

FIG. 6 is a flow diagram of an example method 600 to interrupt a page miss handler in accordance with some embodiments of the disclosure. In some embodiments, the method 600 may be performed by the page miss handler interruption module 107 or 200. For example, the method 600 may be used by the page miss handler interruption module 107 of FIG. 1 or the page miss handler interruption module 200 of FIG. 2 to determine when to interrupt a page miss handler that is currently translating an address for an instruction. The method 3600 may also be performed by processing logic that may comprise hardware (e.g., circuitry, dedicated logic, programmable logic, microcode, etc.), software, firmware, or a combination thereof. Alternatively, other components of the computing system 100 may perform some or all of the operations of the method 600.

As shown in FIG. 6, the method 600 may begin with the processing logic identifying a first instruction associated with a request for a page miss handler and a second instruction associated with a current execution of the page miss handler (block 610). The processing logic may further determine if the first instruction and the second instruction are associated with the same address (block 620). For example, the processing logic may compare the address to be translated of the first instruction with the address to be translated of the second instruction. If the address of each of the first instruction and the second instruction are identical or the same, then the page miss handler may not be interrupted (block 630). However, if the address of each of the first instruction and the second instruction are not identical or the same (e.g., the addresses are different), then the processing logic may determine an age of each of the first and second instructions (block 640). The processing logic may further determine whether the first instruction is older than the second instruction (block 650). If the first instruction is not older than the second instruction, then the page miss handler may not be interrupted (block 640). For example, the address of the second instruction may continue to be translated by the page miss handler. However, if the first instruction is older than the second instruction, then the processing logic may further determine if the current execution state of the page miss handler satisfies a condition (block 670). If the current execution state of the page miss handler does not satisfy the condition, then the page miss handler may not be interrupted (block 680). In some embodiments, the condition may correspond to whether the current execution state is before or after a point (e.g., a particular execution state) where it may be more efficient for the page miss handler to complete the current translation of an address associated with the second instruction instead of interrupting the page miss handler to translate an address associated with the first instruction. For example, if the finishing of the translation of the address associated with the second instruction is below a threshold amount of time, then it may be considered that the completing of the current translation of the address associated with the second instruction is more efficient than interrupting the page miss handler. However, if the current execution state of the page miss handler does satisfy the condition, then the page miss handler may be interrupted (block 690). For example, the page miss handler may stop translating the address of the second instruction and may begin to translate the address of the first instruction.

Figure 7:
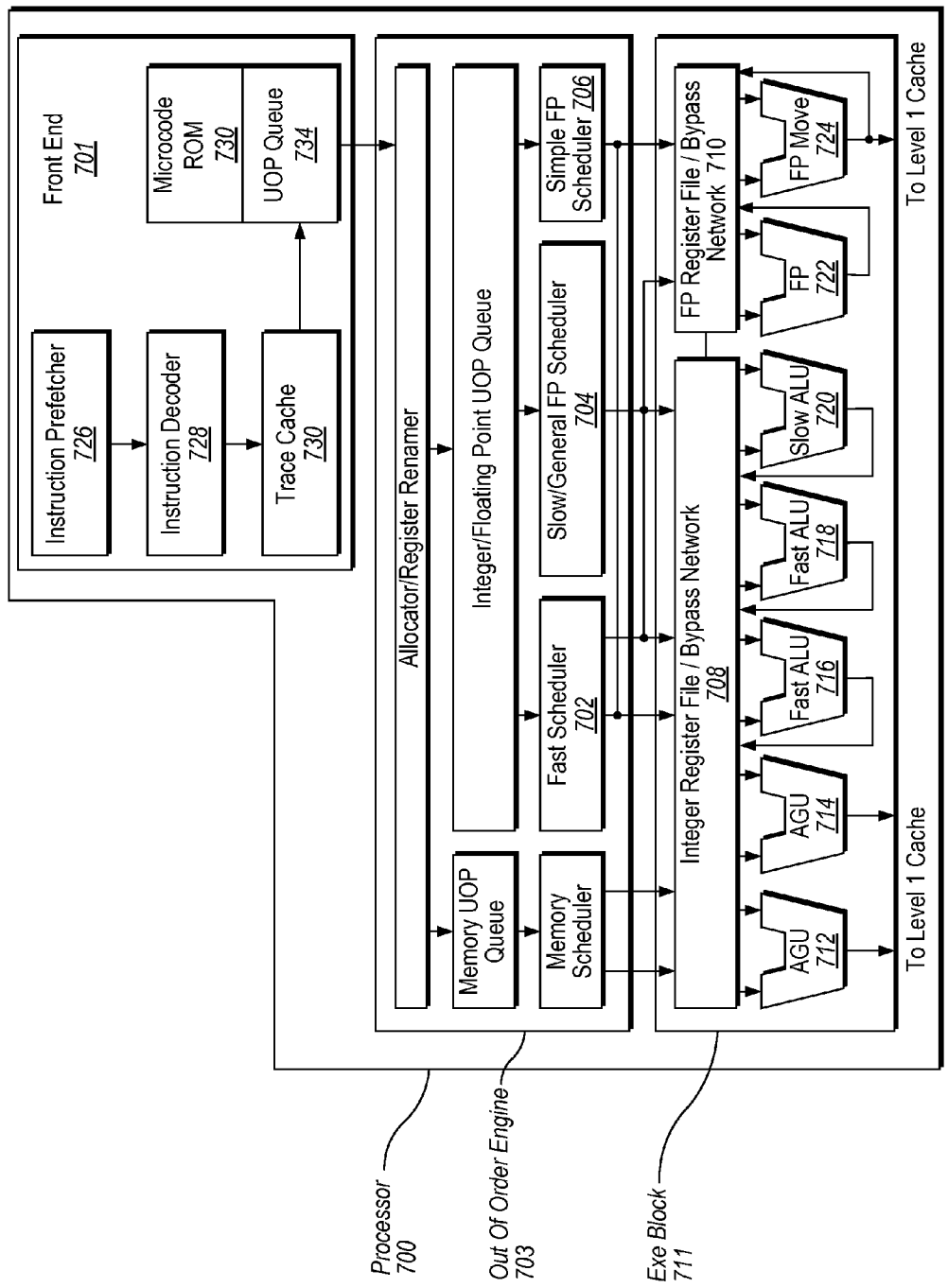
FIG. 7 illustrates a block diagram of the micro-architecture for a processor that includes logic circuits to interrupt a page miss handler according to one embodiment.

FIG. 7 illustrates a block diagram of the micro-architecture for a processor 700 that includes logic circuits to interrupt a page miss handler according to one embodiment. The page miss handler interruption module 107 and 200 may be implemented in the processor 700. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution. In some embodiments, the out-of-order execution engine 703 and the exe block 711 may notify a retirement unit with regard to the allocation and completion/execution of an instruction.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to manage checkpoints of an out of order architecture according to one embodiment. In one embodiment, the execution block 711 of processor 700 may include the checkpoint module 200, to manage checkpoints of an out of order architecture according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
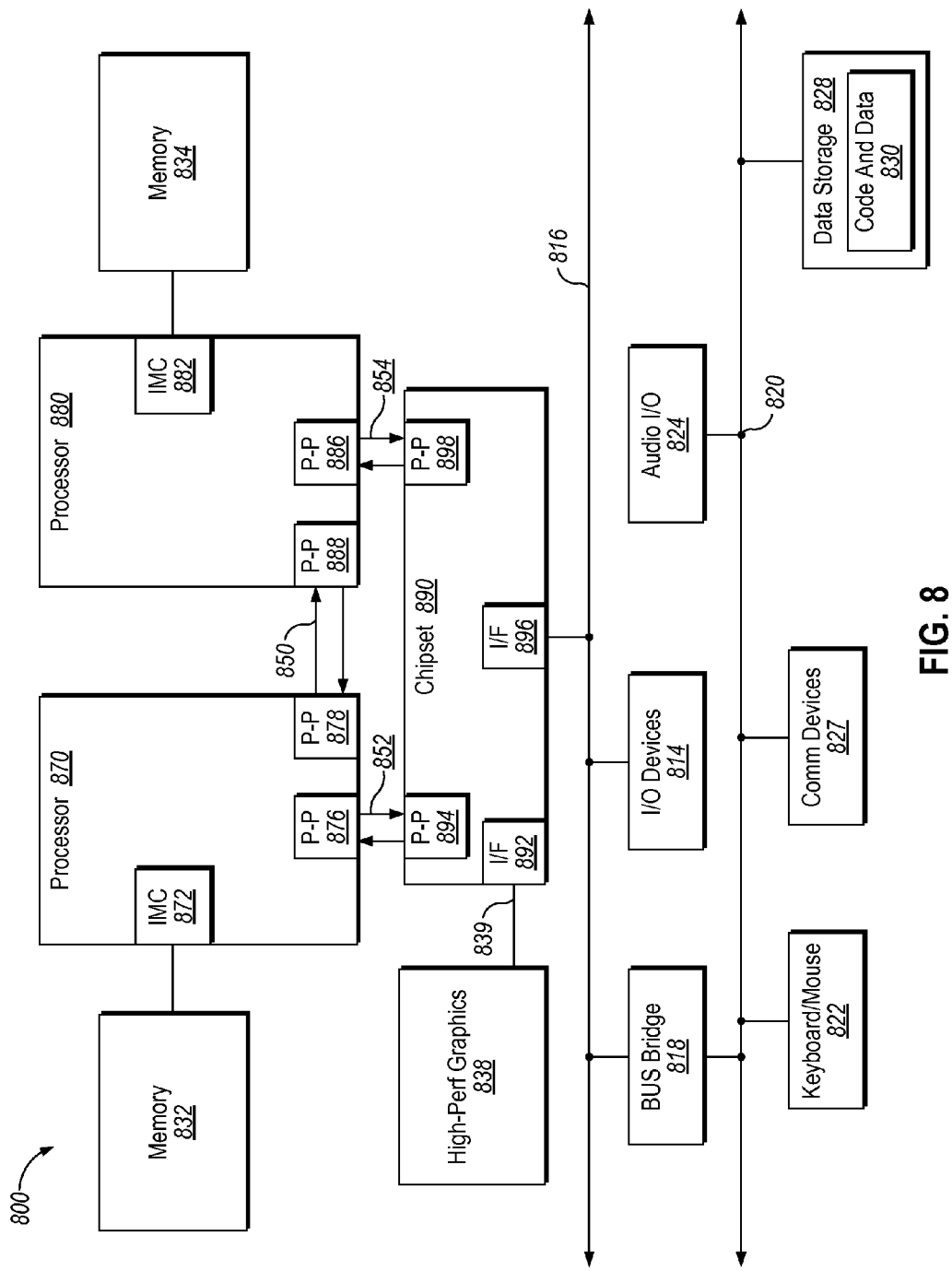
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores, although potentially many more cores may be present in the processors. The processors each may include hybrid write mode logics in accordance with an embodiment of the present. In some embodiments, the page miss handler interruption modules 107 and 200 may be implemented in the multiprocessor system 800. For example, the page miss handler interruption modules 107 and 200 may be implemented in the processor 870 and/or the processor 880.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
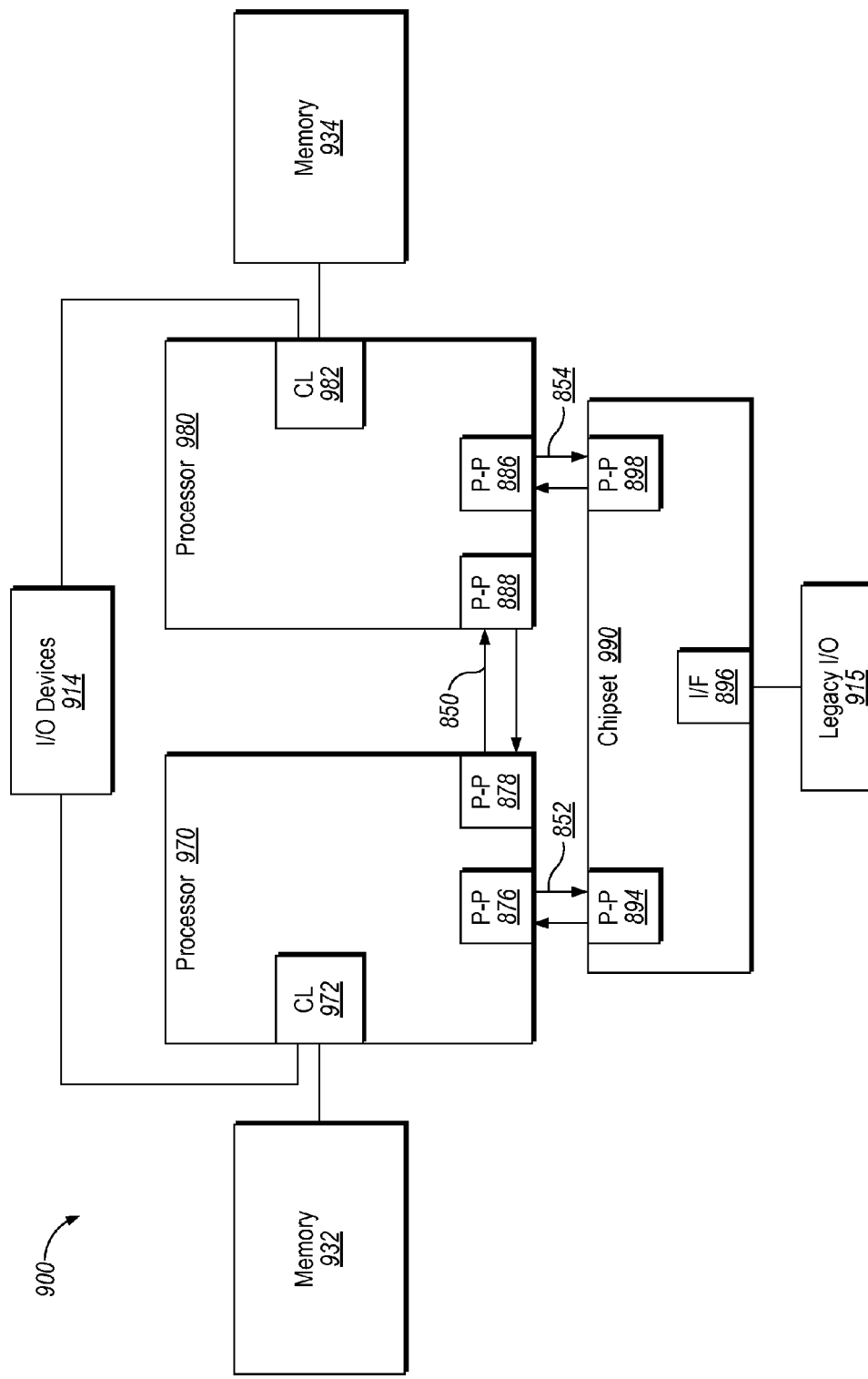
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 915 are also coupled to the control logic 972, 982. Legacy I/O devices 915 are coupled to the chipset 990. In some embodiments, the page miss handler interruption modules 107 and 200 may be implemented in the system 900. For example, the page miss handler interruption modules 107 and 200 may be implemented in the processor 970 and/or the processor 980.

Figure 10:
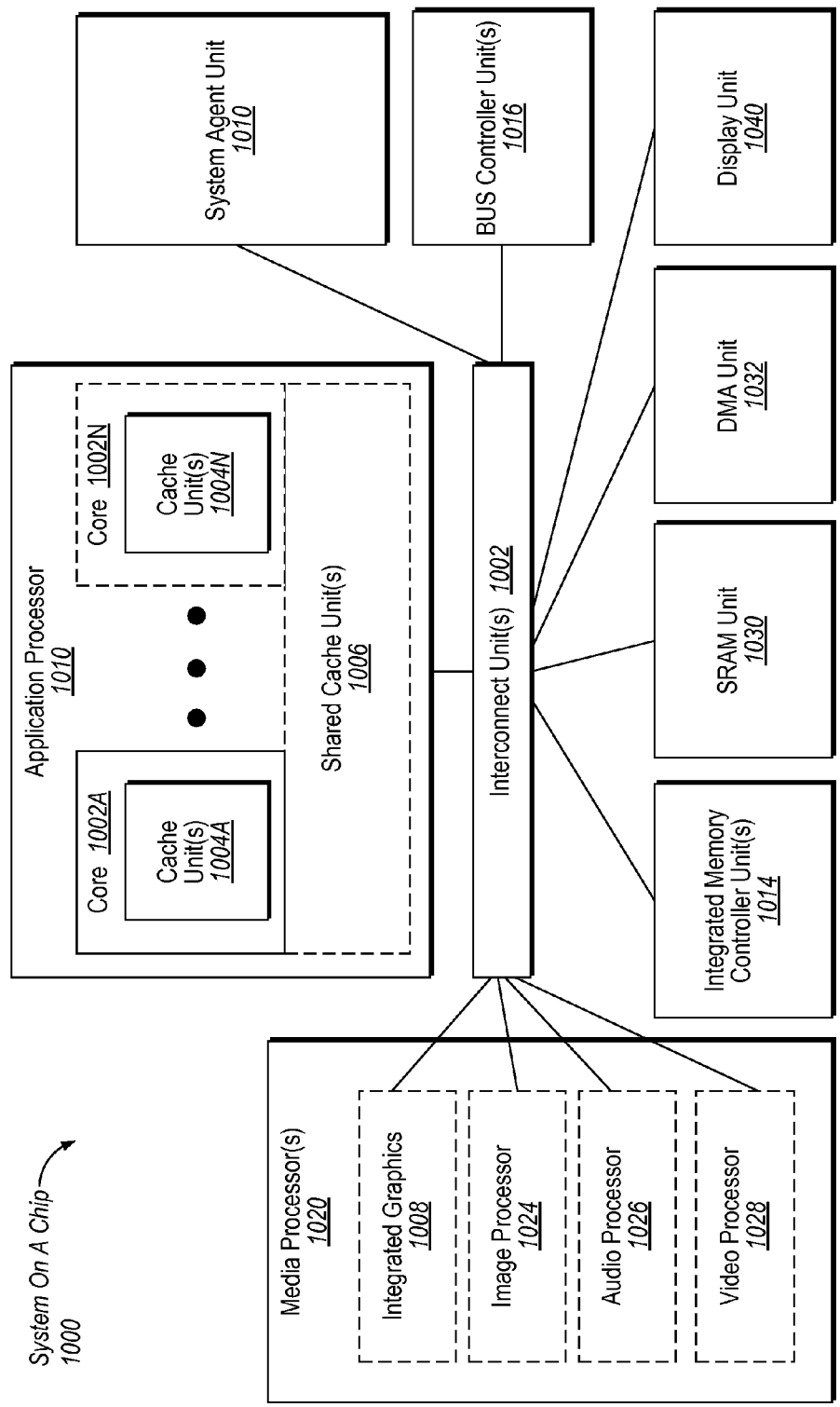
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Similar elements in FIG. 10 bear like reference numerals. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. In some embodiments, the page miss handler interruption modules 107 and 200 may be implemented in the SoC 1000. For example, the page miss handler interruption modules 107 and 200 may be implemented in the application processor 1010 and/or cores 1002A-N.

Figure 11:
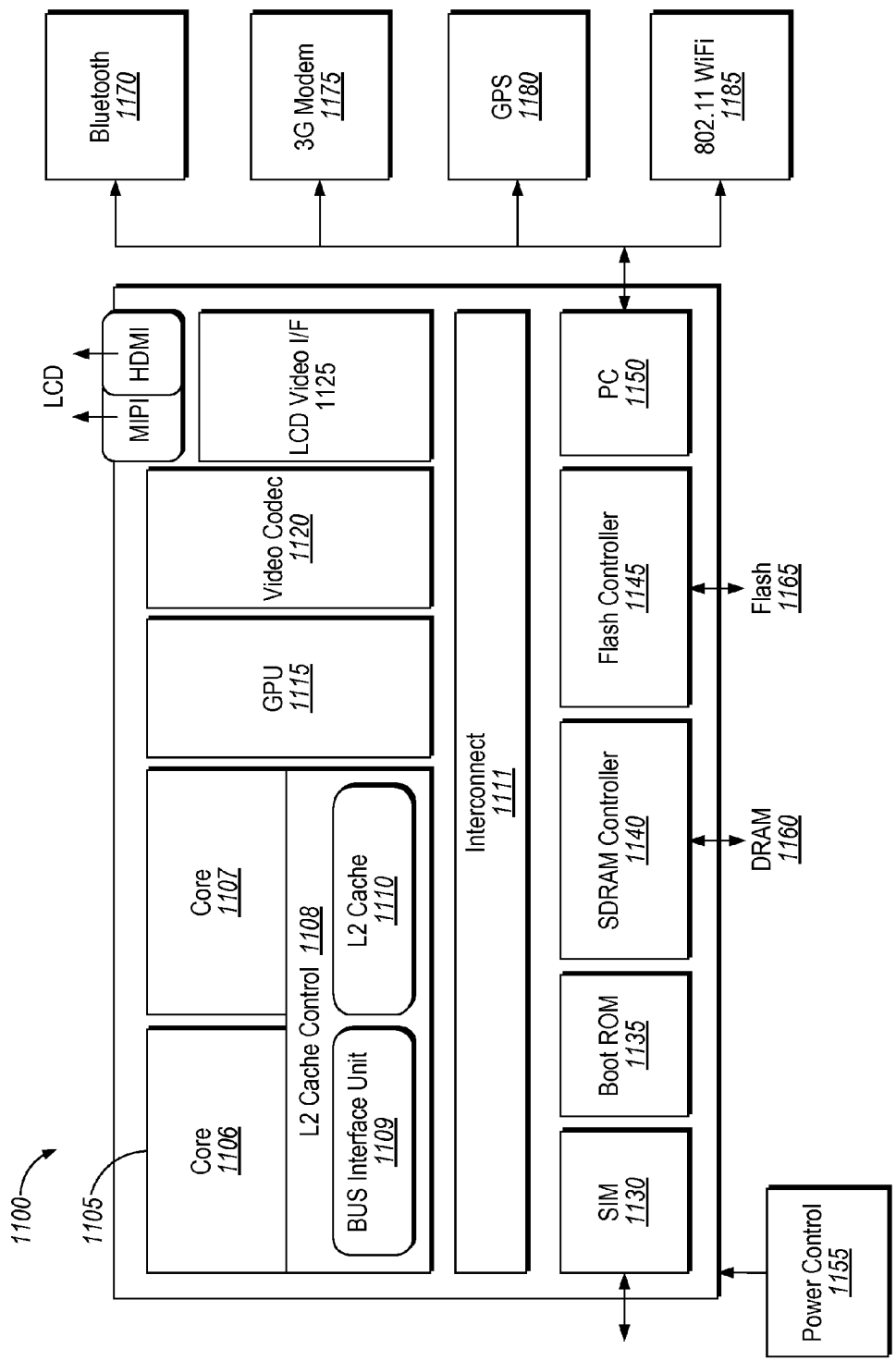
FIG. 11 illustrates another implementation of a block diagram for a computing system.

Turning next to FIG. 11, an embodiment of a system on-chip (SOC) design in accordance with embodiments of the disclosure is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. In some embodiments, the page miss handler interruption modules 107 and 200 may be implemented in the SCC 1100. For example, the page miss handler interruption modules 107 and 200 may be implemented in the core 1106 and/or core 1107.

Here, SOC 1100 includes two cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g.

Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
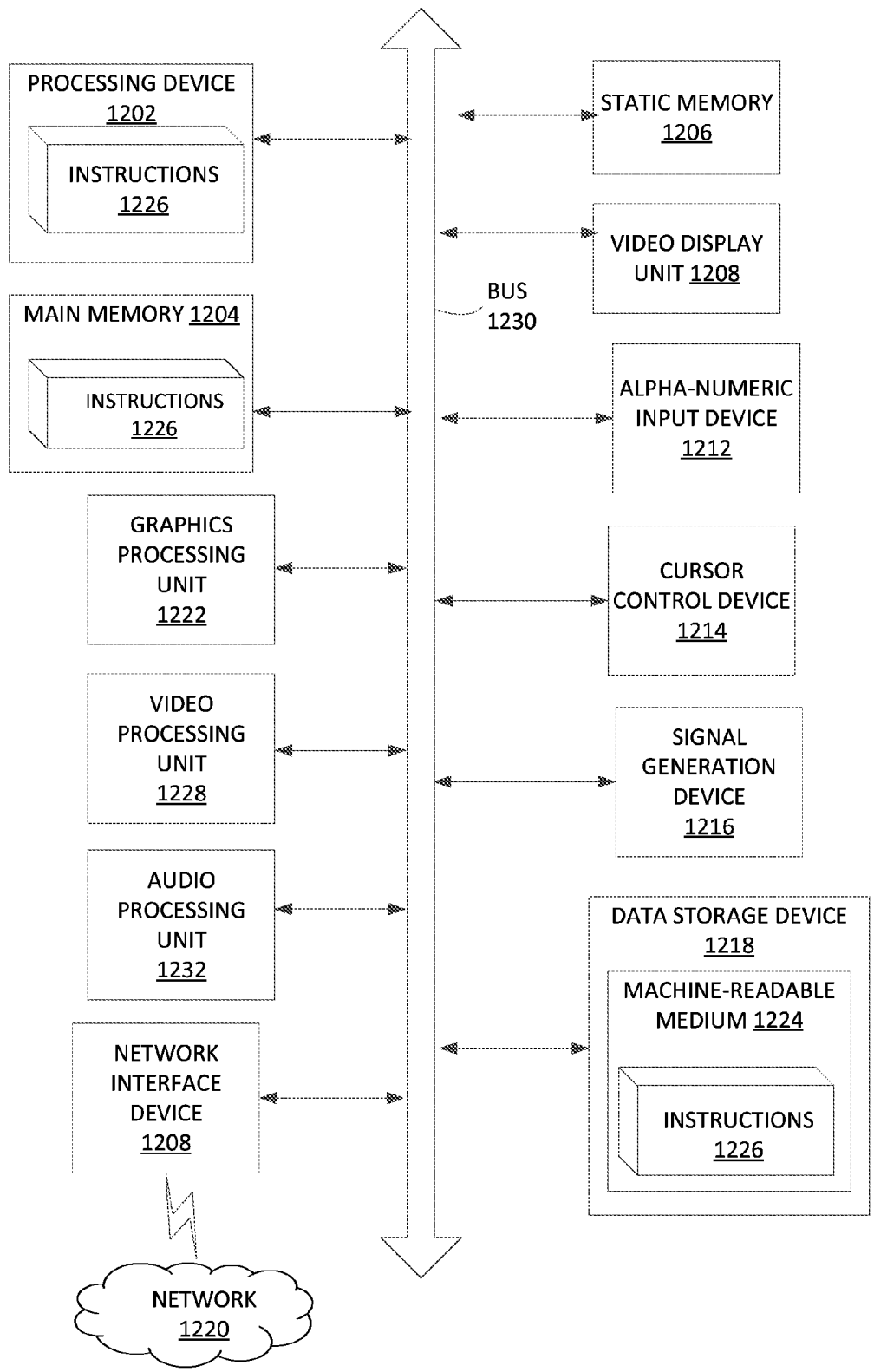
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230. In some embodiments, the page miss handler interruption modules 107 and 200 may be implemented in the system 1200. For example, the page miss handler interruption modules 107 and 200 may be implemented in the processing device 1202 and/or be stored in the instructions 1226.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising a memory, one or more functional units coupled to the memory, and a page miss handler interruption module coupled to the memory and the one or more functional units and to identify a first operation associated with a request for a page miss handler, identify a second operation associated with a current execution of the page miss handler, determine an age of the first operation and an age of the second operation, and interrupt the page miss handler based on the age of the first operation and the age of the second operation by stopping the current execution of the page miss handler for the second operation and starting execution of the page miss handler for the first operation.

In Example 2, in the processor of Example 1, the page miss handler translates a virtual address to a physical address for the first operation or the second operation in response to determining that information associated with the translation is not stored in a cache memory.

In Example 3, in the processor of any of Examples 1-2, the page miss handler interruption module is further to identify an address of the first operation and an address of the second operation, wherein the interrupting of the page miss handler is further based on the address of the first operation and the address of the second operation.

In Example 4, in the processor of any of Examples 1-3, the page miss handler is interrupted when the address of the first operation is different than the address of the second operation, and the page miss handler is not interrupted when the address of the first operation is the same as the address of the second operation.

In Example 5, in the processor of any of Examples 1-4, the interrupting of the page miss handler is further based on a state of the page miss handler.

In Example 6, in the processor of any of Examples 1-5, the page miss handler is interrupted in response to the state of the page miss handler being at a state before a particular state and is not interrupted in response to the state of the page miss handler being after the particular state.

In Example 7, in the processor of any of Examples 1-6, the interrupting of the page miss handler based on the age of the first operation and the age of the second operation comprises stopping the execution of the page miss handler for the second operation when the age of the first operation is older than the age of the second operation.

In Example 8, in the processor of any of Examples 1-7, the page miss handler interruption module is further to execute the page miss handler to perform an address translation associated with the second operation after a completion of another address translation associated with the first operation.

In Example 9, in the processor of any of Examples 1-8, the age of the first operation corresponds to when the first operation is issued by the one or more functional units.

In Example 10, a method comprises identifying a first operation associated with a request for a page miss handler, identifying a second operation associated with a current operation of the page miss handler, determining an age of the first operation and an age of the second operation, and interrupting, by a page miss handler interruption module of a processor, the page miss handler based on the age of the first operation and the age of the second operation by stopping execution of the page miss handler for the second operation and starting execution of the page miss handler for the first operation.

In Example 11, in the method of Example 10, the page miss handler translates a virtual address to a physical address for the first operation or the second operation in response to determining that information associated with the translation is not stored in a cache memory.

In Example 12, in the method of any of Examples 10-11, the method further comprises identifying an address of the first operation and an address of the second operation. The interrupting of the page miss handler is further based on the address of the first operation and the address of the second operation.

In Example 13, in the method of any of Examples 10-12, the page miss handler is interrupted when the address of the first operation is different than the address of the second operation, and the page miss handler is not interrupted when the address of the first operation is the same as the address of the second operation.

In Example 14, in the method of any of Examples 10-13, the interrupting of the page miss handler is further based on a state of the page miss handler.

In Example 15, in the method of any of Examples 10-14, the page miss handler is interrupted in response to the state of the page miss handler being at a state before a particular state and is not interrupted in response to the state of the page miss handler being after the particular state.

In Example 16, in the method of any of Examples 10-15, the interrupting of the page miss handler based on the age of the first operation and the age of the second operation comprises stopping the execution of the page miss handler for the second operation when the age of the first operation is older than the age of the second operation.

In Example 17, in the method of any of Examples 10-16, the method further comprises executing the page miss handler to perform an address translation associated with the second operation after a completion of another address translation associated with the first operation.

In Example 18, in the method of any of Examples 10-17, the age of the first operation corresponds to when the first operation is issued by the one or more functional units.

Various embodiments may have different combinations of the structural features described above. For instance, all optional features of the processors and methods described above may also be implemented with a processor described herein and specifics in the examples may be used anywhere in one or more embodiments.

Example 19 is an integrated circuit comprising a processor core and a page miss handler interruption module associated with the processor core to identify a first operation associated with a request for a page miss handler, identify a second operation associated with a current operation of the page miss handler, determine an age of the first operation and an age of the second operation, and interrupt the page miss handler based on the age of the first operation and the age of the second operation by stopping execution of the page miss handler for the second operation and starting execution of the page miss handler for the first operation.

In Example 20, in the integrated circuit of Example 19, the page miss handler translates a virtual address to a physical address for the first operation or the second operation in response to determining that information associated with the translation is not stored in a cache memory.

In Example 21, in the integrated circuit of any of Examples 19-20, the page miss handler interruption module is further to identify an address of the first operation and an address of the second operation, where the interrupting of the page miss handler is further based on the address of the first operation and the address of the second operation.

In Example 22, in the integrated circuit of any of Examples 19-21, the page miss handler is interrupted when the address of the first operation is different than the address of the second operation, and wherein the page miss handler is not interrupted when the address of the first operation is the same as the address of the second operation.

In Example 23, in the integrated circuit of any of Examples 19-22, the interrupting of the page miss handler is further based on a state of the page miss handler, and the page miss handler is interrupted in response to the state of the page miss handler being at a state before a particular state and is not interrupted in response to the state of the page miss handler being after the particular state.

Various embodiments may have different combinations of the operational features described above. For instance, all optional features of the method described above may also be implemented with respect to a non-transitory computer-readable storage medium. Specifics in the examples may be used anywhere in one or more embodiments.

Example 24 is a non-transitory machine-readable storage medium including instructions that, when executed by a processor, cause the processor to perform the method of Examples 10-18.

Example 25 is a system on a chip (SOC) comprising a plurality of functional units and a page miss handler interruption module, coupled to the functional units, to identify a first operation associated with a request for a page miss handler, identify a second operation associated with a current execution of the page miss handler, determine an age of the first operation and an age of the second operation, and interrupt the page miss handler based on the age of the first operation and the age of the second operation by stopping the current execution of the page miss handler for the second operation and starting execution of the page miss handler for the first operation.

In Example 26, the SOC of Example 25 further comprises the subject matter of Examples 1-9.

In Example 27, the SOC of Example 25, the page miss handler interruption module is further operable to perform the subject matter of Examples 10-18.

In Example 28, the SOC of Example 25 further comprises the subject matter of Examples 19-23.

Example 29 is an apparatus comprising means for identifying a first operation associated with a request for a page miss handler, means for identifying a second operation associated with a current execution of the page miss handler, means for determining an age of the first operation and an age of the second operation, and means for interrupting the page miss handler based on the age of the first operation and the age of the second operation by stopping the current execution of the page miss handler for the second operation and starting execution of the page miss handler for the first operation.

In Example 30, the apparatus of Example 29 further comprises the subject matter of any of Examples 1-9 and 20-23.

Example 31 is an apparatus comprising a page miss handler interruption module, where the page miss handler interruption module is configured to perform the method of any of Examples 10-18.

In Example 32, the apparatus of Example 31 further comprises the subject matter of any of Examples 1-9 and 19-28.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to cache memory data compression and decompression in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, and 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a memory;
   one or more functional units coupled to the memory; and
   a page miss handler interruption module coupled to the memory and the one or more functional units and to:
   identify a first operation associated with a request for a page miss handler;
   identify a second operation associated with a current execution of the page miss handler;
   determine an age of the first operation and an age of the second operation;
   identify a state of the page miss handler that is associated with an amount of time for the page miss handler to complete a translation of an address of the second operation; and
   interrupt the page miss handler based on the ages of the first and second operations and the state of the page miss handler by stopping the current execution of the page miss handler for the second operation and starting execution of the page miss handler for the first operation.

2. The processor of claim 1, wherein the page miss handler translates a virtual address to a physical address for the first operation or the second operation in response to determining that information associated with the translation is not stored in a cache memory.

3. The processor of claim 1, wherein the page miss handler interruption module is further to:
   identify an address of the first operation and an address of the second operation, wherein the interrupting of the page miss handler is further based on the address of the first operation and the address of the second operation.

4. The processor of claim 3, wherein the page miss handler is interrupted when the address of the first operation is different than the address of the second operation, and wherein the page miss handler is not interrupted when the address of the first operation is the same as the address of the second operation.

5. The processor of claim 1, wherein the page miss handler is interrupted in response to the state of the page miss handler being at a state before a particular state and not interrupted in response to the state of the page miss handler being after the particular state.

6. The processor of claim 1, wherein the interrupting of the page miss handler based on the age of the first operation and the age of the second operation comprises stopping the execution of the page miss handler for the second operation when the age of the first operation is older than the age of the second operation.

7. The processor of claim 1, wherein the page miss handler interruption module is further to:
   execute the page miss handler to perform an address translation associated with the second operation after a completion of another address translation associated with the first operation.

8. The processor of claim 1, wherein the age of the first operation corresponds to when the first operation is issued by the one or more functional units.

9. A method comprising:
   identifying a first operation associated with a request for a page miss handler;
   identifying a second operation associated with a current operation of the page miss handler;
   determining an age of the first operation and an age of the second operation;
   identifying a state of the page miss handler that is associated with an amount of time for the page miss handler to complete a translation of an address of the second operation; and
   interrupting, by a page miss handler interruption module of a processor, the page miss handler based on the ages of the first and second operations and the state of the page miss handler by stopping execution of the page miss handler for the second operation and starting execution of the page miss handler for the first operation.

10. The method of claim 9, wherein the page miss handler translates a virtual address to a physical address for the first operation or the second operation in response to determining that information associated with the translation is not stored in a cache memory.

11. The method of claim 9, wherein the method further comprises:
    identifying an address of the first operation and an address of the second operation, wherein the interrupting of the page miss handler is further based on the address of the first operation and the address of the second operation.

12. The method of claim 11, wherein the page miss handler is interrupted when the address of the first operation is different than the address of the second operation, and wherein the page miss handler is not interrupted when the address of the first operation is the same as the address of the second operation.

13. The method of claim 9, wherein the page miss handler is interrupted in response to the state of the page miss handler being at a state before a particular state and not interrupted in response to the state of the page miss handler being after the particular state.

14. The method of claim 9, wherein the interrupting of the page miss handler based on the age of the first operation and the age of the second operation comprises stopping the execution of the page miss handler for the second operation when the age of the first operation is older than the age of the second operation.

15. The method of claim 9, wherein the method further comprises:
    executing the page miss handler to perform an address translation associated with the second operation after a completion of another address translation associated with the first operation.

16. The method of claim 9, wherein the age of the first operation corresponds to when the first operation is issued by the one or more functional units.

17. An integrated circuit comprising:
    a processor core; and
    a page miss handler interruption module associated with the processor core and to:
    identify a first operation associated with a request for a page miss handler;
    identify a second operation associated with a current operation of the page miss handler;
    determine an age of the first operation and an age of the second operation;

identify a state of the page miss handler that is associated with an amount of time for the page miss handler to complete a translation of an address of the second operation; and interrupt the page miss handler based on the ages of the first and second operations and the state of the page miss handler by stopping execution of the page miss handler for the second operation and starting execution of the page miss handler for the first operation.

18. The integrated circuit of claim 17, wherein the page miss handler translates a virtual address to a physical address for the first operation or the second operation in response to determining that information associated with the translation is not stored in a cache memory.

19. The integrated circuit of claim 17, wherein the page miss handler interruption module is further to:

identify an address of the first operation and an address of the second operation, where the interrupting of the page miss handler is further based on the address of the first operation and the address of the second operation.

20. The integrated circuit of claim 19, wherein the page miss handler is interrupted when the address of the first operation is different than the address of the second operation, and wherein the page miss handler is not interrupted when the address of the first operation is the same as the address of the second operation.

21. The integrated circuit of claim 17, wherein the page miss handler is interrupted in response to the state of the page miss handler being at a state before a particular state and not interrupted in response to the state of the page miss handler being after the particular state.

* * * * *